(12) United States Patent
Carlson et al.

(10) Patent No.: US 8,705,148 B2
(45) Date of Patent: Apr. 22, 2014

(54) PRINT AND SCAN SHARING PAPER PICK AND PAPER MOTION CONTROL IN A MULTI-FUNCTION PRINTER

(75) Inventors: Gregory F. Carlson, Corvallis, OR (US); Steven Goss, Corvallis, OR (US); Randall Stockberger, Independence, OR (US); Patrick A. McKinley, Corvallis, OR (US); Todd A. McClelland, Corvallis, OR (US); Ronald G. Paul, Corvallis, OR (US); Roger Switzer, Vancouver, WA (US)

(73) Assignee: Marvell International Ltd. (BM)

( * ) Notice: Subject to any disclaimer, the term of this patent is extended or adjusted under 35 U.S.C. 154(b) by 110 days.

(21) Appl. No.: 12/961,264

(22) Filed: Dec. 6, 2010

(65) Prior Publication Data

US 2011/0075183 A1 Mar. 31, 2011

Related U.S. Application Data

(63) Continuation of application No. 11/755,665, filed on May 30, 2007, now Pat. No. 7,986,445.

(60) Provisional application No. 60/809,972, filed on Jun. 1, 2006.

(51) Int. Cl.
*G06K 15/16* (2006.01)
*H04N 1/00* (2006.01)

(52) U.S. Cl.
CPC ................................ *H04N 1/00599* (2013.01)
USPC ........... 358/474; 358/1.12; 358/401; 358/498

(58) Field of Classification Search
USPC ............ 358/474, 486, 496, 498; 399/16, 361, 399/363, 367; 271/3.14, 3.17, 14.01
See application file for complete search history.

(56) References Cited

U.S. PATENT DOCUMENTS

| | | | |
|---|---|---|---|
| 4,706,125 | A | 11/1987 | Takagi |
| 5,124,800 | A | 6/1992 | Hashimoto |
| 5,127,644 | A | 7/1992 | Yoshihiro et al. |
| 5,196,691 | A | 3/1993 | Kitani et al. |
| 5,587,812 | A | 12/1996 | Kasuya |
| 5,727,890 | A | 3/1998 | Stodder et al. |
| 5,749,570 | A | 5/1998 | Iwata et al. |

(Continued)

FOREIGN PATENT DOCUMENTS

| | | |
|---|---|---|
| EP | 1 424 848 A1 | 6/2004 |
| FR | 2 859 806 | 3/2005 |
| JP | 2002167062 * | 6/2002 ............... B65H 3/06 |

OTHER PUBLICATIONS

International Search Report dated Feb. 28, 2008 for International Application No. PCT/US2007/012962.

(Continued)

*Primary Examiner* — Jerome Grant, II

(57) ABSTRACT

A multi-function printer having a compact size and portable configuration while providing printing, scanning and copying functionalities is disclosed herein. The multi-function printer includes a printer assembly and a scanner assembly configured to cooperatively utilize the same pick and paper movement systems along a common feed or paper path to perform these printing, scanning and copying functions. Thus, the disclosed multi-function printer may require a less complex paper movement and control system which, in turn, reduces the printer's overall weight while increasing its flexibility and/or portability.

20 Claims, 4 Drawing Sheets

(56) References Cited

U.S. PATENT DOCUMENTS

| | | | |
|---|---|---|---|
| 5,751,448 A | 5/1998 | Kim et al. | |
| 5,833,381 A | 11/1998 | Kellogg et al. | |
| 5,896,206 A | 4/1999 | Kellogg | |
| 6,101,291 A | 8/2000 | Arney et al. | |
| 6,147,777 A * | 11/2000 | Jung | 358/473 |
| 6,297,885 B1 * | 10/2001 | Murakami | 358/1.1 |
| 6,942,211 B2 | 9/2005 | Teo et al. | |
| 7,349,127 B2 | 3/2008 | Kadomatsu | |
| 7,536,148 B2 | 5/2009 | Fukumura | |
| 7,719,730 B2 * | 5/2010 | Park et al. | 358/498 |
| 7,823,878 B2 * | 11/2010 | Su et al. | 271/186 |
| 2002/0067939 A1 * | 6/2002 | Hamada et al. | 399/367 |
| 2002/0105686 A1 * | 8/2002 | Hasegawa et al. | 358/498 |
| 2004/0004319 A1 * | 1/2004 | Hattori et al. | 271/10.01 |
| 2004/0186923 A1 | 9/2004 | Seto | |
| 2004/0190081 A1 | 9/2004 | Kadomatsu | |
| 2004/0190082 A1 | 9/2004 | Seto | |
| 2005/0053183 A1 | 3/2005 | Abe et al. | |
| 2005/0219645 A1 * | 10/2005 | Maruchi et al. | 358/474 |
| 2006/0050329 A1 | 3/2006 | Yokota | |
| 2006/0087701 A1 * | 4/2006 | Onuma | 358/461 |
| 2006/0215219 A1 * | 9/2006 | Yorimoto et al. | 358/1.15 |
| 2006/0274383 A1 | 12/2006 | Ha et al. | |
| 2007/0052164 A1 | 3/2007 | Watase et al. | |
| 2008/0024840 A1 | 1/2008 | Carlson | |
| 2008/0049271 A1 | 2/2008 | Carlson | |
| 2008/0151328 A1 | 6/2008 | Gregerson et al. | |

OTHER PUBLICATIONS

International Search Report dated Feb. 15, 2008 for International Application No. PCT/US2007/012961.

Copending U.S. Appl. No. 11/755,686, filed May 30, 2007.

* cited by examiner

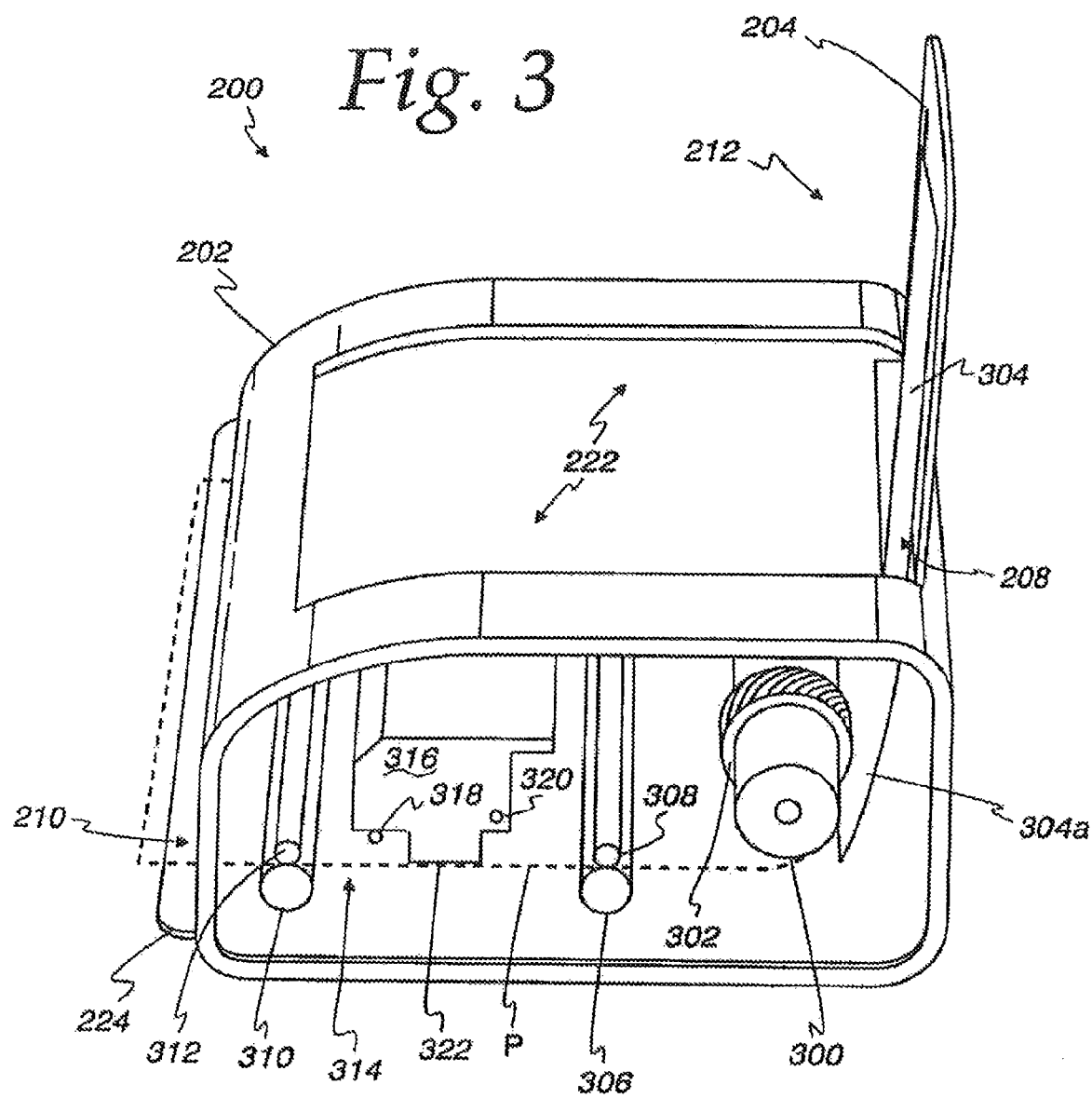

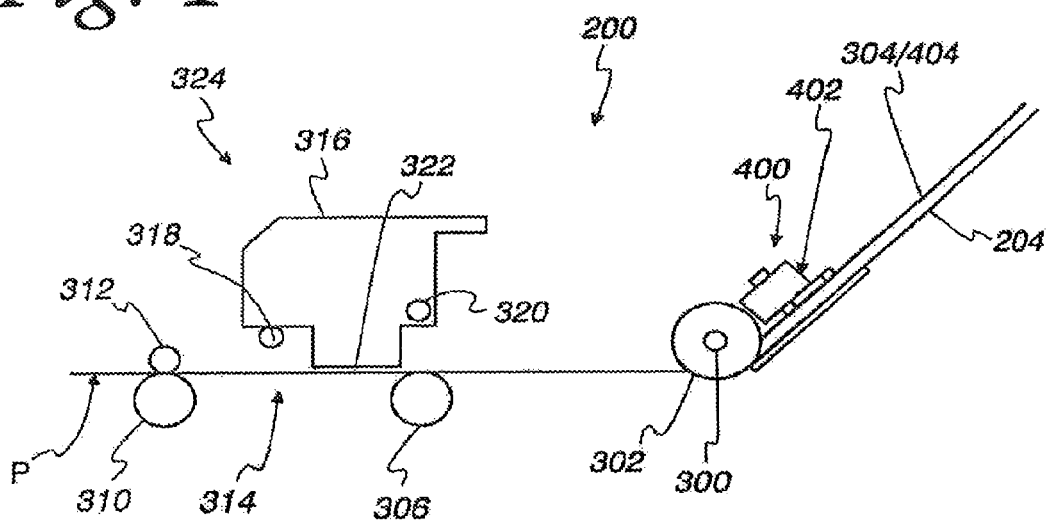
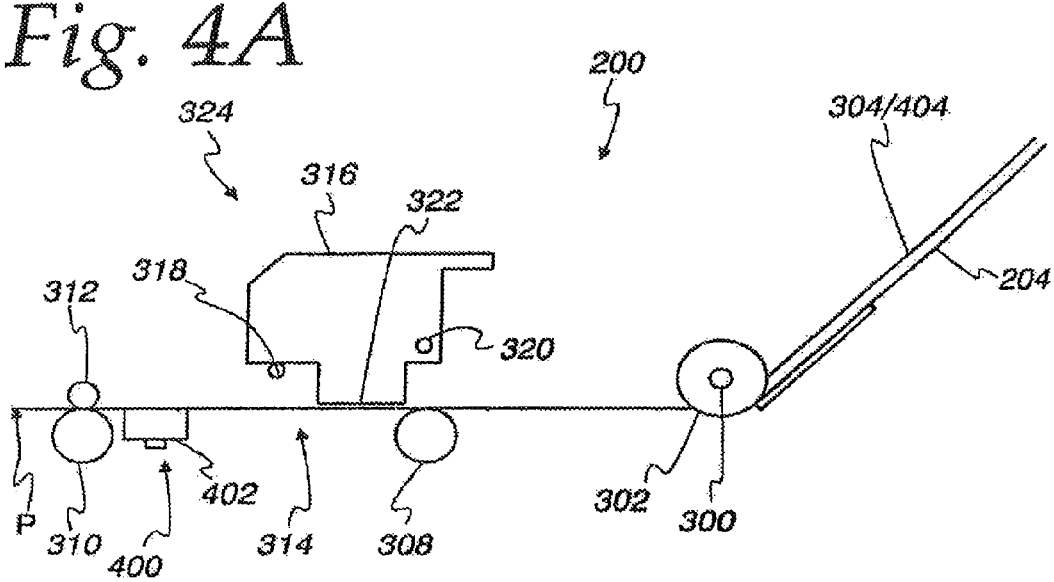

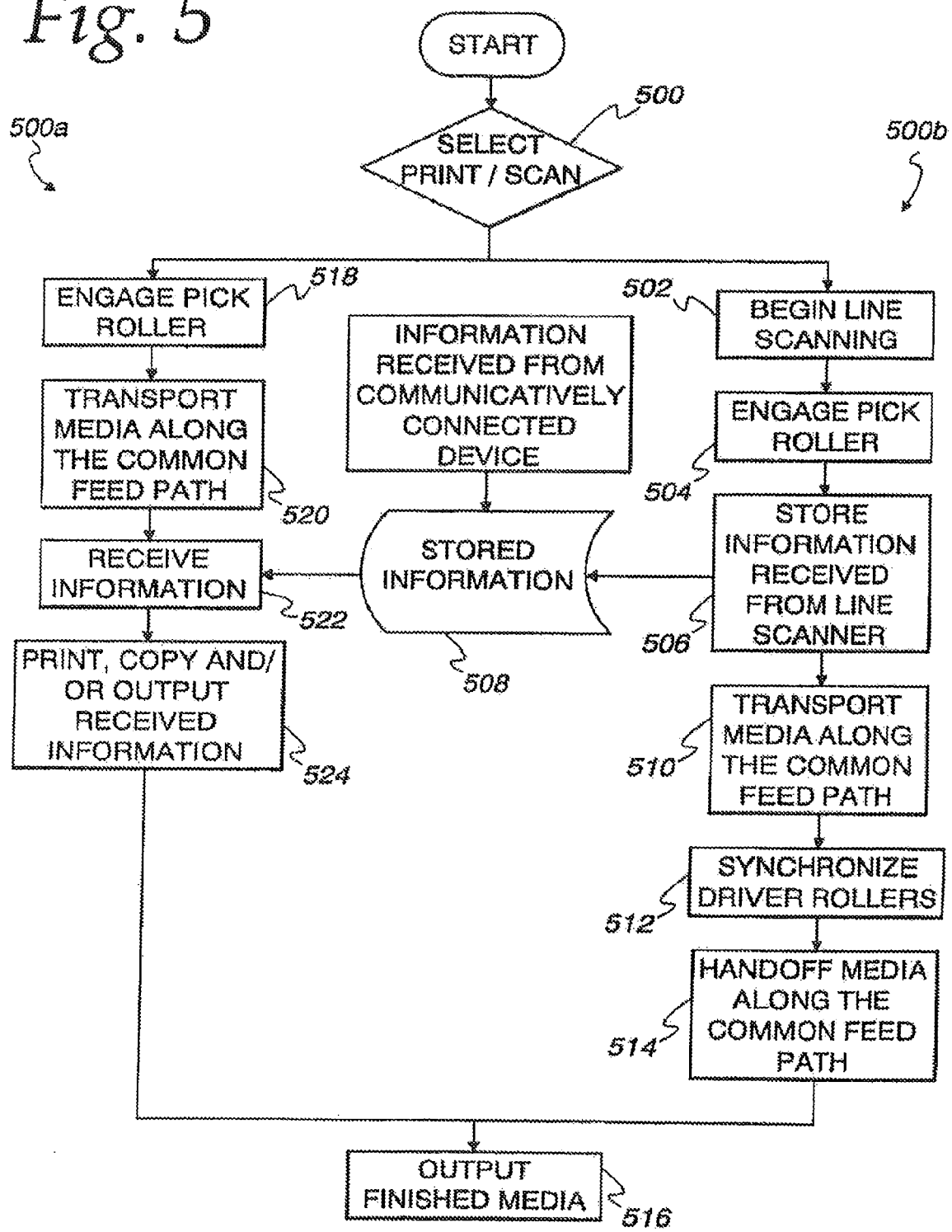

PRINT AND SCAN SHARING PAPER PICK AND PAPER MOTION CONTROL IN A MULTI-FUNCTION PRINTER

CROSS REFERENCE TO RELATED APPLICATIONS

This patent application is a continuation application of U.S. patent application Ser. No. 11/755,665 filed May 30, 2007, which is hereby incorporated by reference in its entirety. This patent application claims the priority benefit under 35 U.S.C. §119(e) of U.S. provisional patent application Ser. No. 60/809,972, filed on Jun. 1, 2006, titled "Print and Scan Sharing Paper Pick and Paper Motion Control in a Multi-function Printer."

This patent application is related to commonly-assigned U.S. patent application Ser. No. 11/755,686, filed concurrently, titled, "Floating Scan Sensor in a Multi-Function Printer."

The contents of these patent applications are incorporated herein for all purposes.

TECHNICAL FIELD

The present disclosure generally relates to multi-function printers, and more specifically to compact multi-function printers that include a common paper path for scanning and printing.

BACKGROUND

Multi-function printers, e.g., printers capable of printing, scanning and/or transmitting a facsimile, are well known. Some multi-function printers include a separate printer assembly coupled to a scanner assembly. The printer assembly works in any known manner to produce physical representations of provided data such as, for example, text documents, images or combinations thereof. The scanner assembly often includes a flat glass plate upon which an object to be scanned can be placed or automatically loaded. A scanning device is translated relative to the flat glass plate and the object to be scanned, and an image representative of the scanned object is stored into a memory. The stored image, in turn, is communicated to the printer assembly for reproduction.

Known multi-function printers, while operable for many activities, are often large enough to make transportation difficult. Moreover, the size or footprint of the multi-function printer requires a large amount of workspace to easily and effectively utilize the device. These known multi-function printers typically include two feed or paper paths to control and direct the movement of paper and other flexible media to the printer and scanner assemblies. The mechanisms and components of these duplicate paths increase the overall cost, size and complexity of these known multi-function printers.

It would be desirable to provide a multi-function printer having reduced mechanical and electrical complexity and cost. It would further be desirable to provide a multi-function printer that was portable and sized for efficient use in confined or space limited environments.

SUMMARY

The present disclosure provides exemplary embodiments of a multi-function printer system, these exemplary embodiments are intended to highlight and disclose the teachings of the present invention and are not intended to limit or narrow the scope of protection sought. The exemplary multi-function printer includes a document feeder configured to receive a medium, a pick mechanism having a pick roller and configured to cooperate with the document feeder. The exemplary multi-function printer further includes a scanner assembly, a printer assembly, a feed mechanism configured to cooperate with the document feeder and the pick roller and a common feed path configured to guide the medium and defined between the document feeder, the pick roller and the feed mechanism, wherein the common feed path is shared by the scanner assembly and the printer assembly.

In another embodiment, a method for performing multiple operations on a media in a multi-function printer is disclosed. The method includes providing a document feeder having a first end sized to accept the media and a second end sized to support the media, and providing a pick roller aligned adjacent to the second end of the document feeder that is configured to engage the media adjacent to the second end. The method further includes aligning a scanner adjacent to the pick roller, providing a print head adjacent to the scanner and the pick roller, and providing a feed mechanism, the feed mechanism configured to cooperate with the print head, the pick roller and the scanner to convey the media along a common feed path.

In another embodiment, a multi-function printer includes means for feeding documents configured to receive a medium, means for picking documents configured to cooperate with to the means for feeding document, means for scanning and means for printing. The multi-function printer further includes means for conveying documents configured to cooperate with the means for feeding documents and the means for picking documents, and means for guiding the medium along a common feed path defined between the means for feeding documents, the means for picking document and the means for conveying documents, wherein the common feed path is shared by the means for scanning and the means for printing.

In another embodiment, a multi-function printer system includes a processor and a memory in communication with the processor such that the memory stores program logic executable by the processor. The program logic includes a subroutine programmed to control a scanner assembly. a subroutine programmed to control a printer assembly, and a subroutine programmed to control a feed mechanism, wherein the feed mechanism is configured to feed a medium along a common feed path and wherein the common feed path is shared by the scanner assembly and the printer assembly.

Additional features and advantages of the present invention are described in, and will be apparent from, the following Detailed Description and the figures.

BRIEF DESCRIPTION OF THE FIGURES

FIG. 3 is a simplified cut-away side view of the multi-function printer shown in FIG. 2;

FIG. 4 is a simplified side view of the multi-function printer shown in FIG. 2;

FIG. 4A is a simplified side view of another embodiment of the multi-function printer shown in FIG. 2;

FIG. 5 is a flow chart illustrating one example of the functions or steps that may be performed during the operation of a multi-function printer constructed in accordance with the teachings of the present disclosure.

DETAILED DESCRIPTION

The embodiments and concepts discussed herein provide for a multi-function printer having a compact size and portable configuration while providing printing, scanning and copying functionalities. The exemplary multi-function printer includes a printer assembly and a scanner assembly configured to cooperatively utilize the same pick and paper movement systems along a common feed or paper path to perform these printing, scanning and copying functions. Thus, a multi-function printer constructed in accordance with the teaching and disclosure provided herein may utilize a less complex paper movement and control system which, in turn, reduces the printer's overall weight while increasing its flexibility and/or portability.

Figure 1:
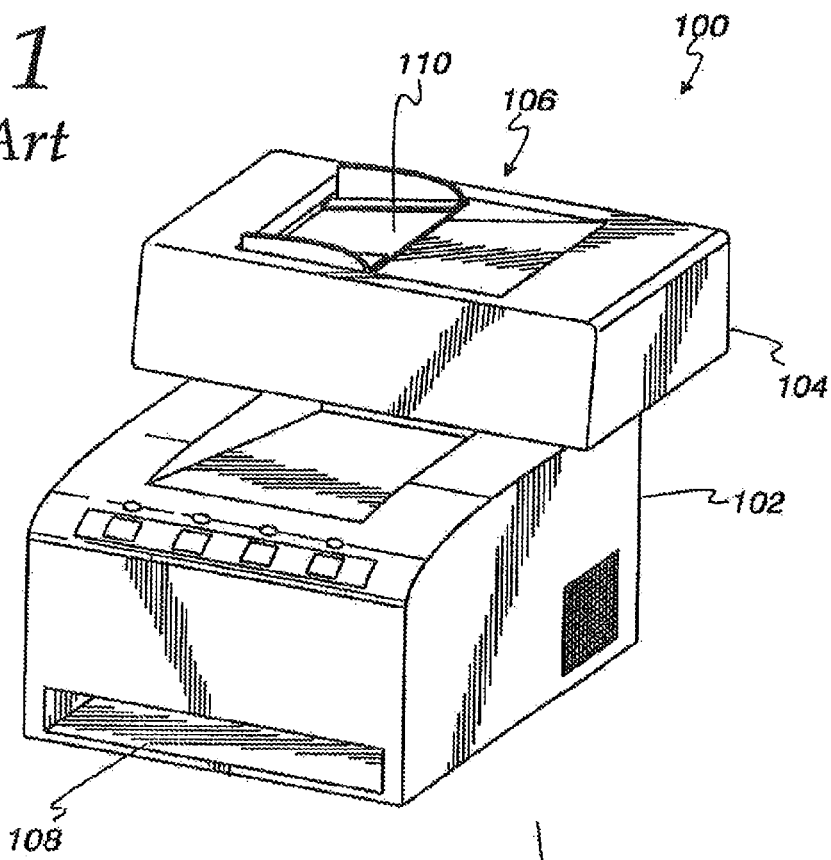
FIG. 1 is a perspective view of a prior art multi-function printer.

FIG. 1 illustrates a prior art multi-function printer 100. The multi-function printer 100 includes a printer 102, a scanner 104 and a document feeder 106. The printer 102 includes a paper tray 108 coupled to a fuser and toner system (not shown), an ink jet delivery system (not shown), or any other type of marking system (not shown). The printer 102 includes paper handling and movement systems to transport media from the paper tray 108 to, for example, the fuser and toner to produce printed documents. The scanner 104 and document feeder 106 include duplicate paper handling and movement systems to transport media positioned in an input tray 110 of the document feeder 106 for scanning via a flat plate scanner (not shown). The scanner 104 and document feeder 106 are shown mounted transversally upon the printer 102 and are configured to share data therebetween. However, the mounting of the scanner 104 and document feeder 106 is not limited to a transverse orientation, but could be placed in other orientations such as in sheer-fed facsimile machines with a scanner path directly above the printer path thereby allowing both the original and the printed paper to move through the individual paths in the same orientation and/or at substantially the same time. In operation, a document may be transported and scanned via the scanner 104 and the document feeder 106. Image data representative of the document may be communicated to the printer 102 for storage, printing or further communication to another connected or networked device. If, for example, the image data is to be printed, media is selected from the paper tray 108 and transported via the printer's paper handling and movement system to, for example, the fuser and toner to produce the desired document copy or image.

Figure 2:
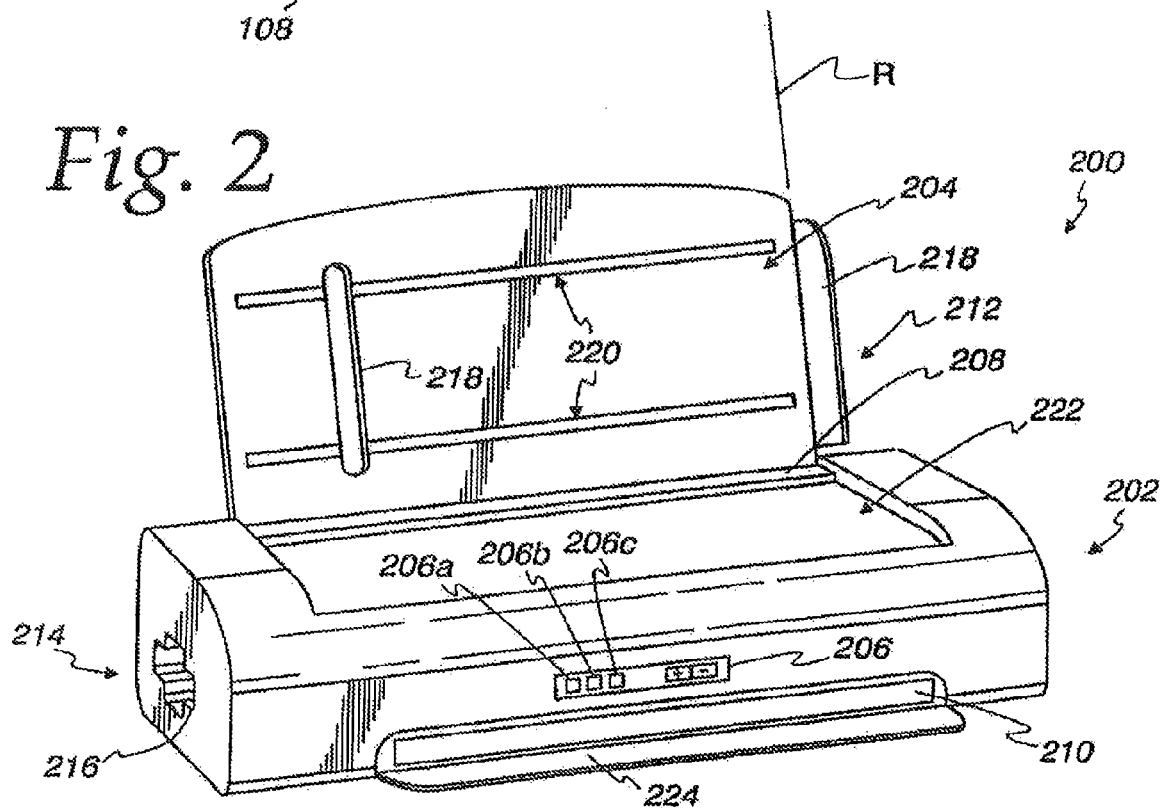
FIG. 2 is a perspective view of one embodiment of a multi-function printer constructed in accordance with the teachings of the present disclosure.

FIG. 2 illustrates one embodiment of a multi-function printer (MFP) 200 constructed in accordance with the teachings and disclosure provided herein. The MFP 200, in this exemplary embodiment, is a portable multi-function printer configured to print, scan, copy and/or transmit facsimile copies of documents or images. For example, the MFP 200 may weigh approximately 5 lbs (approximately 2.3 kgs) and measure approximately 13 inches in width, 3 inches in height and have a depth of approximately 7 inches (approximately 33 cm×7.6 cm×17.8 cm). A device of this size is desirable, for example, for professionals or the like who frequently travel or otherwise work outside of an office where transporting a larger device, such as the multi-function printer 100, would be impractical.

The MFP 200 includes a base or housing 202 hingedly coupled to a paper support or cover 204. In a first or closed position, the cover 204 engages the housing 202 in a transportation configuration. In a second, or open position, the cover 204 is pivoted away from the housing 202 to, for example, a 45-degree angle relative to the housing, for use in operation. The MFP 200 may be configured to feed, print, scan and otherwise handle various sizes and types of documents and media such as: paper, vellum, card stock, transparencies, etc.

In this exemplary embodiment, the base 202 is configured and designed to serve as part of a portable print device, therefore clean and ergonomic styling may be desirable to facilitate transportation and storage of the device. For example, the cover 204 may, in the closed position, provide protection for the print mechanism housed within the base 202 and/or the controls 206 positioned on the base 202. Alternatively, the controls 206, which may include, for example, a power button 206a, indicator lights or LEDs 206b, and/or a toggle 206c, can be positioned on the front portion of the base 202 for easy access.

The base 202 further includes a media input 208 coupled to a media outlet 210. In this embodiment, the media input 208 is a slot sized to accept media, paper, etc., and is aligned adjacent to the cover 204. For example, when the cover 204 is in the open position, the interior surface of the cover 204 smoothly transitions into the media input 208. Thus, any media, such as paper, vellum, etc., placed within the media input 208 is smoothly guided and supported along the inner surface of the cover 204. The supported media is, in turn, aligned into the desired position within the media input 208 and the base 202. Upon execution of a function such as, for example, printing and/or scanning, the media loaded via the media input 208 and the cover 204 will be unloaded or ejected through the media outlet 210. In this way, media may pass from a substantially vertical orientation in the document feeder 212, which may include both the cover 204 and the media input 208, through the body 202 which houses the multi-function printer componentry, and exits the MFP 200 in a substantially horizontal orientation via the media outlet 210.

The body 202 may further include one or more data inputs and data outputs. For example, the body 202 includes a card reader 214. The card reader 214 includes a horizontally aligned slot 216 sized to accept a variety of digital media cards (not shown). The digital media cards could be, for example, a secure digital (SD) card, a MultiMediaCard (MMC), a SmartMedia card or a CompactFlash card. Digital media cards such as these are often available with storage capacities between 8 MB (megabytes) and 4 GB (gigabytes). These media cards are often used to storage digital images, digital movies or movie clips, audio files, etc. Thus, by aligning and inserting a digital media card into the slot 216 of the card reader 214, digital information may be transferred directly to the MFP 200. Alternatively, the MFP 200 may include: a USB (universal serial bus) connector; an Ethernet connector such as an RJ-45 socket; a telephone or modem connector; a WiFi connector for communicating with a wireless local area network (WLAN); and a Bluetooth connector for communicating with a personal area network (PAN). Regardless of the interface chosen, the MFP 200 can be configured to directly accept, convert and process digital images and files for printing, scanning and transmission.

The cover 204, in cooperation with the media input 208, can act as a document feeder or organizer 212. The document feeder 212 can, in other embodiments, be an automatic document feeder that includes a dedicated, integrated paper handling system. The paper handling system could include a separate media movement or drive system as well as spring loaded media alignment and registering devices. Alternatively, the cover 204 may include one or more adjustable guide bars 218 to align and reference media. These guide bars 218 may laterally traverse along ridges or guides 220, relative to each other, to register the media along a desired edge such as the right edge R of the cover 204. In this way, the media may be squarely aligned within the media input 208 to reduce or eliminate unwanted scanning or printing skew from or to the media.

The cover 204, when in the second or closed position, may engage a top portion of the base 202. Alternatively, the cover 204 may flushly engage a recessed portion or pocket 222. The pocket 222 may provide esthetic appeal to the base 202 by hiding and smoothing the overall appearance of the MFP 200. The pocket 220 may functionally provide protection from dirt or other contaminants entering the base 202 via the media input 208 or other open access path. Similarly, the media outlet 210 may be engaged or protected by an outlet cover 224. The outlet cover 224 can be hingedly attached to the base 202 or may simply extend away from the base 202 and include a flexible barrier (not shown) to provide contaminant protection. The flexible barrier may be, for example, overlapping or non-overlapping strips of plastic or a brush-like mesh arrayed over the outlet. The outlet cover 224 may further act as a supplemental media guide for the media traveling through the media outlet 210.

FIG. 3 generally illustrates a simplified, sectional side view of the MFP 200. The sectional side view of the MFP 200 allows normally enclosed, and hidden, printer componentry to be viewed. It will be understood that in the perspective view shown, the body 202 and cover 204 of the MFP 200 extend longitudinally into the page.

The MFP 200 includes a pick shaft 300 and pick roller 302 portions of the document feeder 212. The pick shaft 300 extends roughly the width of the base 202, i.e., the shaft extends longitudinally into the page. The pick shaft 300 may be a solid or rigid shaft coupled to a drive motor (not shown) housed within the base 202. The pick roller 302 may be a single sleeve or cylinder that extends along the length of the pick shaft 300. Alternatively, the pick roller 302 may comprise a series of rings or collars spaced along the length of the pick shaft 300. While this configuration increases the total number of elements that constitute the pick roller 302, the amount of raw material necessary to perform the picking function is reduced because the pick roller 302 does not extend the entire length of the pick shaft 300.

FIG. 3 illustrates one exemplary embodiment of the MFP 200 with media, e.g., one or more sheets of paper 304, loaded within the media input 208 and resting against and supported by the cover 204. For example, if the paper 304 is A4 paper or 8.5 in.×11 in. paper, then the long edge of the paper 304 extends into the media input slot. In this arrangement, the short end of the paper 304 extends into the page and the surface of the paper 304 rests substantially flushly against the surface of the cover 204. A leading edge 304a of the paper 304 abuts or rests in contact against the pick roller 302 when the paper 304 is loaded into the document feeder 212 and a retractable spring-loaded pressure plate 406 (see FIGS. 4 and 4A) urges the paper 304 into contact with the pick roller 302. In operation, when the drive motor engages and rotates the pick shaft 300, the attached pick roller 302 is engaged and rotated as well. As the pick shaft 300 and the pick roller 302 rotate, the outer surface of the pick roller 302 frictionally engages the leading edge 304a of the paper 304 and feeds it into a common feed or paper path, identified by the dashed line and the reference identifier P.

The paper 304, once engaged by the pick roller 302, is guided along the common feed path P to a first roller 306. The first roller 306 may be a drive roller, e.g., the first roller 306 may be directly or indirectly coupled to another drive motor to direct and urge the paper 304 along the common feed path P. The first roller 306 may be aligned with and cooperatively coupled to a first free roller 308. The first roller 306 and the first free roller 308 may be collectively referred to as first rollers 306, 308. The first free roller 308 can be positioned adjacent to the first roller 306 to engage the paper 304 as it moves along the common feed path P. These first rollers 306, 308 may be employed to urge and provide smooth transitions from the substantially vertical position adjacent to the pick roller 302 to a substantially horizontal position along the common feed path P.

A second roller 310 and a second free roller 312 can be arranged and positioned away from the first rollers 306, 308. The second roller 310 and the second free roller 312 may be collectively referred to as second rollers 310, 312. The second rollers 310, 312 may be positioned and aligned near the media outlet 210. As with the first roller 306, the second roller 310 may be directly or indirectly coupled to a drive motor and operate as a driven roller to urge the paper 304 along the common feed path P. The second free roller 312, in turn, may cooperate with the second roller 310 to control the movement of the paper 304. As shown in this exemplary embodiment, the first rollers 306, 308 cooperate with the second rollers 310, 312 to support the paper 304 and establish a stable print area 314.

A print head 316 may be positioned above the print area 314 of the extended paper 304. The print head 316, in this exemplary embodiment, represents an inkjet print head and ink cartridge. However, it will be understood that a fuser and a toner cartridge assembly from a laser printer or any other type of marking system could be utilized without departing from the teachings of the disclosure presented herein. Thus, it will be further understood that as used herein, the terms printer, print head, printer assembly, etc. can be used to denote inkjet assemblies, laser printer assemblies, dot-matrix printer assemblies and/or any other known ink deposition system. The various print technologies and systems disclosed herein may be collectively referred to as the printer assembly 324.

The print head 316 can be slideably mounted to a pair of guide rods 318, 320. The guide rods 318, 320 support the print head 316 above the print area 314 of the paper 304. An alternate embodiment could utilize a single guide rod with an adjacent sheet metal or plastic guide bar arranged to prevent rotation of the print head 316 around the guide rod. This arrangement allows a print orifice 322 aligned above the paper 304 to deposit ink or toner upon the paper surface. The print head 316 may include a drive motor to translate the unit along the guide bars 318, 320 or may be, for example, coupled to and driven by a belt and pulley arrangement.

FIGS. 4 and 4A illustrate simplified side views of embodiments of the MFP 200 constructed in accordance with the teachings presented herein. FIG. 4 illustrates one embodiment of the MFP 200 that includes the printer assembly 324 mounted substantially adjacent to the scanner assembly 400. The scanner assembly 400 may be, for example, a floating scanner assembly as disclosed in co-pending U.S. application Ser. No. 11/755,686, filed concurrently, titled, "Floating Scan Sensor in a Multi-Function Printer". The printer assembly 324, as discussed above in connection with FIG. 3, is positioned adjacent to the print area 314 defined between the first rollers 306, 308 and the second rollers 310, 312. The scanner assembly 400 includes a line scanner 402 mounted substantially adjacent to the pick roller 302.

The line scanner 402 may be a sensor such as a Contact Image Sensor (CIS). The CIS may be a monochrome (black and white) or a color sensor depending on the desired application, etc. The color sensor may include red, green and blue light-emitting diode arrays arranged to illuminate the image to be scanned. Each color of the array may be activated or turned-on in a predefined or rotating sequence to illuminate the image in a desired manner. During each activated or on-time of a diode array, the light reflected from the image being scanned is captured by the light sensing elements of the CIS. The light sensing elements, in turn, generate electrical signals proportional to amount of light received by each element. The generated electrical signals may be serially scanned out to an analog to digital (A/D) converter to begin image processing. The converted digital values provided by the A/D converter may then be stored in a memory (not shown) for use by the system processor (not shown).

In this exemplary embodiment, the line scanner 402 is aligned and mounted along the angled cover 204 and the media input 208 of the document feeder 212 (see FIGS. 2 and 3). The retractable spring-loaded pressure plate 406 is disposed substantially opposite to the line scanner 402 and arranged to urge the media-to-be-scanned 404 into a desirable position relative to the line scanner 402. Thus, if media-to-be-scanned 404 is loaded into the document feeder 212 facing away from the surface of the cover 204, i.e., towards the line scanner 402, the text of images on the media can be scanned, processed or optically recognized by the line scanner 402. For example, as the pick roller 302 and pick shaft 300 are rotated via the drive motor, the media-to-be-scanned 404 is frictionally engaged and transported along the common feed path P. In other words, as the media-to-be-scanned 404 is engaged by the pick roller 302 and enters the common feed path P, the information on the media passes beneath the line scanner 402 for processing. Thus, by loading the media-to-be-scanned 404 into the document feeder 212 and transporting it along the common feed path P, the images and text can be processed by the line scanner 402.

Similarly, as described above, the paper 304 or other media can be loaded into the document feeder 212 and transported along the common feed path P for printing at the printing area 314. In this way, the MFP 200 can scan images and make prints copies, etc. of stored images and/or information utilizing the common feed path P and the same document feeder 212 and paper feed and handling mechanisms. It will be understood that the scanner assembly 400 may be mounted between the pick roller 302 and the print head 316, in order to scan or image the media-to-be-scanned 404 as it enters the common feed path P, after leaving contact with the pick roller 302.

FIG. 4A illustrates another embodiment of the MFP 200 including both the integrated printer assembly 324 and the scanner assembly 400. In this exemplary embodiment, the scanner assembly 400 is mounted inverted with respect to the print head 316 and adjacent to the print area 314 and the second roller 310. Thus, the media-to-be-scanned 404 travels along the common feed path P and is imaged by the line scanner 402 prior to exiting the base 202 via the media outlet 210.

It may be desirable to synchronize the speeds and feeds provided by the first and second rollers 306, 310, respectively, with the pick roller 302. For example, in order to smoothly convey the media-to-be-scanned 404 and/or the paper 304 along the common feed path P, the drive(s) controlling the first and second rollers 306, 310 and the pick roller 302 may be activated sequentially. Thus, the pick roller 302 may engage and begin transporting the media-to-be-scanned 404, and the first roller 306 may be engaged or rotated so that the handoff between the two rollers can be smoothly executed. By having the two rollers moving/rotating at the same speed, the media-to-be-scanned 404 and/or the paper 304 moves smoothly and continuously along the common feed path P thereby minimizing unwanted jerks and tremors. In a similar manner, the speed and handoff between the first roller 306 and the second roller 310 can be controlled. By ensuring continuous movement of the media-to-be-scanned 404 and the paper 304 along the common feed path P, printing and scanning artifacts or irregularities can be minimized.

FIG. 5 is a flow chart illustrating one example of the functions or steps that may be performed during the operation of the MFP 200. At a block 500, the desired multi-function printer functions are selected. For example, a print function 500*a* may be selected to create hard copies of stored information, received facsimiles, or information received from a connected device such as a personal computer or personal digital assistant. Alternatively, a scan function 500*b* may be selected to image or process information from media stored/positioned with the document feeder 212.

At block 502, the line scanner 402 can be activated as part of the scan function 500*b*. Activation of the line scanner 402 may cause a processor to implement program logic stored on a communicatively connected memory. The program logic may include, for example, subroutines to control the scan interval and resolution of the line scanner 402, subroutines to process and correct the scanned image, and subroutines to store the processed image information in a storage location.

At block 504, the pick drive motor may engage and rotate the pick roller 302 and the pick shaft 300. The pick roller 302 may, in turn, frictionally grab the media-to-be-scanned 404. The media-to-be-scanned 404 is moved and/or urged along the common feed path P. The movement of the media-to-be-scanned 404 causes the information, image and/or text thereon to pass in front of the of the line scanner 402.

At block 506, the information, image and/or text scanned by the line scanner 402 as the media-to-be-scanned 404 passes, may be stored. At block 508, the information is stored in a persistent or semi-persistent storage location for later use and/or processing. The persistent or semi-persistent storage location may be a memory card such as, an SD card or a CF card, may be a hard drive or optical storage medium, or any other known information storage device or medium.

At block 510, the media-to-be-scanned 404 is transported along the common feed path P, to allow the line scanner 402 to capture the information stored thereon.

At block 512, the rollers 306 and 310 can be sequentially started. By sequentially starting the roller 306 and 310, these rollers can be traveling at the same radial velocity when the media-to-be-scanned 404 is handed off from the pick roller 302 at block 514. Thus, the media-to-be-scanned 404 will not experience a sudden change in velocity along the common feed path P. Sudden changes in velocity could result in unwanted movement of the media-to-be-scanned 404 which, in turn, may result in scan artifacts or discrepancies being recorded by the line scanner 402.

At block 516, the media-to-be-scanned 404, having been scanned and otherwise processed, can be outputted from the MFP 200 via the media outlet 210.

If, at block 500, the print function 500*a* is selected, then the print assembly 324 may be activated. Activation of the print assembly may cause the processor to implement program logic stored on a communicatively connected memory. The program logic may include, for example, subroutines to control movement of the print assembly 324, subroutines to process and correct the placement and dispersal of ink and/or toner, and subroutines to manipulate the stored or received image information.

At block 518, the drive motor may engage and rotate the pick roller 302 and the pick shaft 300. The pick roller 302 may, in turn, frictionally grab the paper 304 stored within the document feeder 212. The paper 304 is moved and/or urged along the common feed path P.

At block 520, the paper 304 is transported along the common feed path P, to the print area 314.

At block 522, information stored in the persistent or semi-persistent storage location may be received and/or inputted by the print assembly 324 for use. Alternatively, the information may be data transmitted from a communicatively coupled personal computer or other device, or may be received directly from the scanner assembly 400, etc.

At block 524, the print assembly 324 and the print head 316 can utilize the received information to deposit ink or toner onto the paper 304 to create a hard copy of the information.

At block 516, the paper 304 processed by the printer assembly 324 can be outputted from the MFP 200 via the media outlet 210.

It should be understood that various changes and modifications to the presently preferred embodiments described herein will be apparent to those skilled in the art. Such changes and modifications can be made without departing from the teachings of the present invention and without diminishing its intended advantages. It is therefore intended that such changes and modifications be covered by the appended claims.

What is claimed is:

1. A multi-function printer comprising:
   a document feeder configured to support a medium;
   a medium advancing device configured to engage the medium and advance the medium from the document feeder to a feed path;
   a scanner assembly configured to obtain image data from the medium at a scanning location as the medium advances from the document feeder and along the feed path, wherein the scanning location is on the feed path and the scanner assembly remains stationary as the scanner assembly obtains the image data at the scanning location;
   a plate positioned relative to the scanner assembly and configured to receive and position the medium toward the scanning location; a printing cartridge positioned on the feed path and configured to deliver a marking material onto the medium, wherein the printing cartridge delivers the marking material at a marking location that is separately located from the scanning location; and
   a feeding roller positioned along the feed path and configured to advance the medium along the feed path.

2. The multi-function printer of claim 1, wherein the medium advancing device is a pick member that frictionally engages the medium.

3. The multi-function printer of claim 2, wherein the pick member comprises a pick roller that extends along a width of the medium or a pick shaft and a collar spaced along the pick shaft.

4. The multi-function printer of claim 1, wherein the scanner assembly further comprises a contact image sensor including an array of light-emitting diodes to illuminate the image and an array of light sensing elements to generate electrical signals proportional to the image data.

5. The multi-function printer of claim 1, wherein the document feeder supports the scanner assembly.

6. The multi-function printer of claim 5, wherein the plate is a spring-loaded plate.

7. The multi-function printer of claim 1, wherein the scanner assembly is positioned on the feed path downstream of the printing cartridge.

8. The multi-function printer of claim 1, wherein the scanner assembly is positioned on the feed path upstream from the printing cartridge.

9. The multi-function printer of claim 8, wherein the feeding roller is a first feeding roller, the multi-function printer comprising:
   a second feeding roller, wherein the first feeding roller is upstream of the printing cartridge and the second feeding roller is downstream of the scanner assembly such that the first feeding roller and the second feeding roller cooperate to stabilize the medium adjacent to the printing cartridge and adjacent to the scanner assembly.

10. The multi-function printer of claim 1, wherein the printing cartridge comprises an inkjet print head and the marking material is ink.

11. The multi-function printer of claim 1, wherein the printing cartridge comprises a toner cartridge and the marking material is toner for laser printing.

12. The multi-function printer of claim 1, wherein the scanner assembly is further configured to be separately activated from the printing assembly.

13. A method for performing multiple operations on a medium in a multi-function printer, the method comprising:
   activating a scanner assembly;
   activating a medium advancing device to advance the medium from a document feeder supporting the medium along a feed path, wherein the feed path includes a printing location where a printing assembly is configured to deliver a marking material onto the medium;
   receiving the medium at a plate positioned relative to the scanner assembly, and activating the plate to move the medium towards a scanning location on the feed path; and
   obtaining, by the scanner assembly, image data from the medium at a the scanning location along the feed path while the scanner assembly remains stationary, wherein the scanning location is separately located from the printing location.

14. The method of claim 13, wherein the medium advancing device is a pick member that frictionally engages the medium.

15. The method of claim 13, wherein the document feeder supports the scanner assembly.

16. The method claim 13, wherein the scanner assembly is positioned on the feed path upstream from the printing cartridge.

17. The method of claim 13, further comprising:
   selecting a printing function;
   activating the printing assembly separately from the scanner assembly in response to the selection of the printing function;
   receiving image data from an external source; and
   depositing marking material on the medium based on the image data at the printing location as the medium is fed along the feed path.

18. The method of claim 13, further comprising:
   selecting a scanning function;
   activating the scanner assembly separately from the printing assembly in response to the selection of the scanning function;
   obtaining image data;
   storing the image data in a memory;
   selecting a printing function;
   activating the printing assembly separately from the scanner assembly in response to the selection of the printing function;
   receiving the image data from the memory; and depositing marking material on the medium based on the image data.

19. The method of claim 13, wherein the scanner assembly is separately activated from the printing assembly.

20. The method of claim 13, wherein the scanner assembly is positioned on the feed path downstream from the printing cartridge.

* * * * *